G. CRAMTON.
Corn-Planter.
No. 24,541. Patented June 28, 1859.
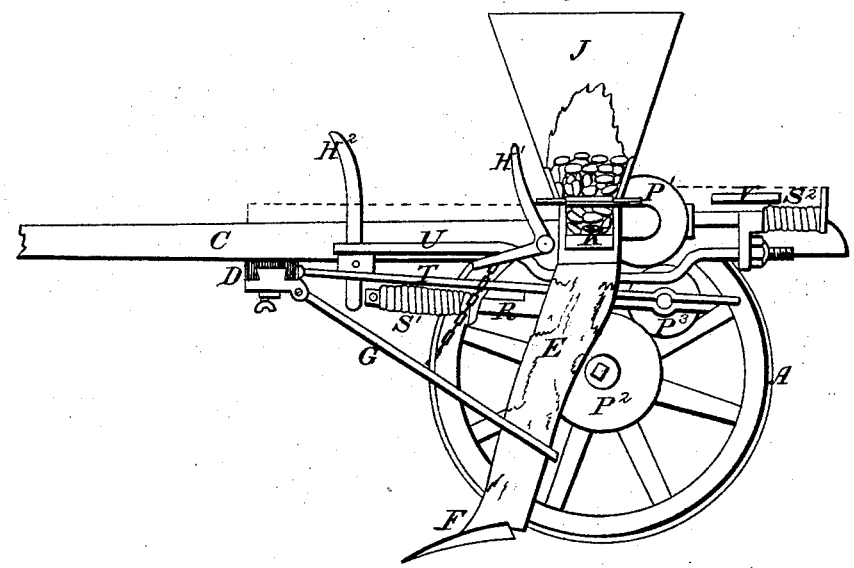
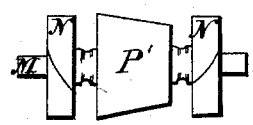
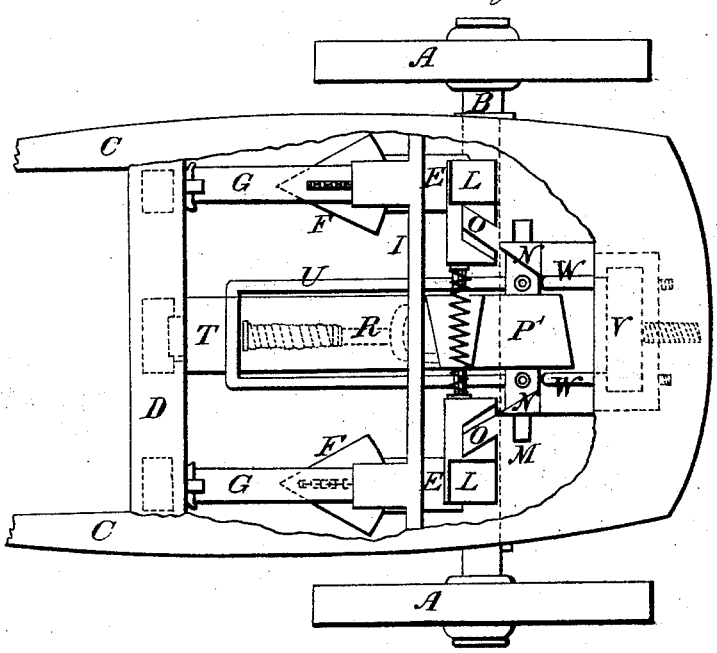
Witnesses:
Inventor:
Giles Cramton

UNITED STATES PATENT OFFICE.

GILES CRAMTON, OF MARSHALL, MICHIGAN.

IMPROVEMENT IN SEED-PLANTERS.

Specification forming part of Letters Patent No. 24,541, dated June 28, 1859.

*To all whom it may concern:*

Be it known that I, GILES CRAMTON, of the city of Marshall, in the county of Calhoun and State of Michigan, have invented a new and useful Improvement on the Machine for Planting Corn or Similar Seed in Rows; and I do hereby declare that the following is a full, clear, and exact description of the construction and operation of the same, reference being had to the annexed drawings, making a part of this specification, in which—

Figure 1 is a side view with the near wheel and side of frame removed. Fig. 2 is a plan or top view. Fig. 3 is a view of the cam-shaft detached.

Similar letters of reference indicate corresponding parts in all the figures.

This improvement consists of a mode for regulating the distances each way at which the corn is to be planted, and for insuring the correct planting of the first and subsequent hills in every row planted, by the use of a pair of cone-pulleys with intermediate driver operating by friction, in connection with a system of spring-stops, and the several parts being arranged and operated relatively with each other in the manner herein to be described; and to enable others to fully understand my invention, I will proceed to describe my usual mode of constructing and operating it.

Two wheels, A A, are attached to an axle, B, which turns in bearings formed in trusses framed in the sides C C of a rectangular frame, near the hinder end. These two sides C C may be extended forward, so as to form a pair of shafts, befween which the draft-animal works, and either one of the wheels may be left free on the axle to facilitate the turning of the machine. A platform (indicated by the dotted lines in Fig. 1) is placed on the upper side of the frame, containing a seat (not seen) for the driver.

To the forward girt of the frame a metal strip, D, is attached, which has a dovetailed or side-lipped groove extending the whole width of the frame, the use of which I will hereinafter explain.

E E are the two seed-tubes for planting two rows at once. The upper portions are made of leather or anything sufficiently flexible, and the lower portions, to which the shares F F are connected, are made of sheet metal. The metallic part of each tube is attached to a brace-bar, as seen at G G, each bar being hinged to a guide-piece which fits into the groove in the strip D, and is fastened by a set-bolt, so as to hold the shares firmly at any required distance apart, said shares being lifted from the ground, when necessary, by pulling the lever H', which turns a shaft, I, the arms of which are connected by chains to the bars G G.

The seed is first admitted by a hopper, J, into a chamber, K, above each seed-tube, as more clearly seen in Fig. 1, by a pair of slides, L L, and is discharged by an exactly similar pair at the bottom of the chambers into the tubes. Each pair of slides works inside of separate casings. The two composing a pair are connected together by a spiral spring, which fits onto a pin on the inner ends of each.

The slides are worked by a short shaft, M, placed opposite the seed-chambers, which carries a pair of cams or wipers, N N, the beveled sides of which act in corresponding-shaped grooves O O, formed in the edges of the slides, which are left thicker in these parts to present more surface to the action of the cams, which thus cause an alternate action of the upper and lower slides, as the cams by revolving engage in the respective grooves, the springs closing them when liberated. Motion is communicated to the cam-shaft M as follows:

A conical-shaped pulley, P', forming a frustum of a cone, with breadth of face and taper sufficient to meet the requirements of a variable speed, is keyed fast on the center of the cam-shaft M, and a corresponding-shaped pulley is keyed on the center of the axle B, (marked P², ) which is placed in a reversed position to P'. An intermediate pulley, (marked P³,) with a narrow face which is slightly rounded and of a diameter rather larger than the space between the other two, is hung to one end of a tension-bar, R, which is connected, by a loop at one end and guides at the other, to steady it sidewise, to a hanging bar, T, which reaches the front girt, and is hinged to a guide-piece which fits into the grooved strip D, and is secured to it in any required position, so as to bring the said pully into contact with the others at such point as will give the necessary speed to the shaft M for planting any given distance apart in the furrows. An adhesion sufficient to work the slides is produced by the stiff spiral spring S', placed between the hanging loop and a check-pin through the end of the said tension-bar R.

The seed-slides will not work in backing, as the cams N N cannot pass through the grooves in that direction; but to stop the working of the feed-slides when going forward, a lever, H², which passes through the platform and has its fulcrum-pin in bars on the upper side or the hanging bar T, acts upon the end of the tension-bar R and throws the pulley P³ from its adhesion to the other two. At the same time that this is done the aforesaid lever (at a point above the fulcrum) throws forward a yoke, U, which is connected to a sliding guide-plate, V, carrying two stop-pins, W W, and a liberating-spring, S², behind the shaft M. These pins, when the yoke is thrown forward, as described, catch in opposite holes drilled out in proper positions in the shaft; but in order to effect this properly the action of the lever must be so adjusted by due lead that the rounded ends of the stop-pins shall just enter the holes before the pulley P³ is actually thrown out of gear.

The mode of operating this machine is as follows: Two straight and parallel furrows are first made on opposite sides of the field at a right angle with the intended rows, as guides for starting. The driver, having properly adjusted and charged the machine with seed, starts at one of the furrows aforesaid and drives in a straight line to the other, which plants two rows at regular intervals. He then, on planting the last two hills, places his foot on lever H² and throws pulley P³ out of contact, this motion at the same time locking the cam-shaft M, as heretofore described. This, however, cannot be done until the seed-chambers have been charged to begin the next two rows with. At the same time that lever H² is pressed with the foot, lever H' is pulled backward by the hand, which lifts the shares from the ground, and the driver turns the machine round to a proper starting-point relative with the lining-furrow to begin the next two rows. Then he drops the shares and removes his foot from lever H². When this is done the spring S' draws into gear pulley P³, and S² draws back the stop-pins and yoke to their former position, which liberates the cam-shaft M, and, motion being given to the machine, the planting is resumed by depositing the seed in hills exactly opposite the first sown, and so on until the whole field is planted.

I do not claim separately any of the within-described devices; but

What I do claim as my invention, and desire to secure by Letters Patent, is—

The application and use of the pulleys P' P² P³, in combination with the adjustable hanger T, tension-bar R, lever H², and yoke U, with its attached spring-stops W W, the whole being arranged, constructed, and operated substantially as and for the purposes specified.

GILES CRAMTON.

Witnesses:
    FRANCIS W. SHEARMAN,
    GEORGE JOHNSON.